(12) United States Patent
Viorel et al.

(10) Patent No.: US 10,743,272 B2
(45) Date of Patent: Aug. 11, 2020

(54) COORDINATED BEAMFORMING

(71) Applicant: Cable Television Laboratories, Inc., Louisville, CO (US)

(72) Inventors: Dorin Viorel, Erie, CO (US); Jennifer Andreoli-Fang, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 284 days.

(21) Appl. No.: 15/435,200

(22) Filed: Feb. 16, 2017

(65) Prior Publication Data

US 2017/0238271 A1  Aug. 17, 2017

Related U.S. Application Data

(60) Provisional application No. 62/295,590, filed on Feb. 16, 2016.

(51) Int. Cl.
*H04B 7/024* (2017.01)
*H04W 56/00* (2009.01)
*H04W 16/28* (2009.01)
*H04B 7/06* (2006.01)
*H04L 5/00* (2006.01)

(52) U.S. Cl.
CPC ......... *H04W 56/002* (2013.01); *H04B 7/024* (2013.01); *H04B 7/0617* (2013.01); *H04L 5/005* (2013.01); *H04W 16/28* (2013.01)

(58) Field of Classification Search
None
See application file for complete search history.

(56) References Cited

U.S. PATENT DOCUMENTS

| | | | | |
|---|---|---|---|---|
| 9,144,082 | B2* | 9/2015 | Rubin | H04W 72/12 |
| 2006/0148525 | A1* | 7/2006 | Moon | H01Q 1/246 |
| | | | | 455/562.1 |
| 2013/0237218 | A1* | 9/2013 | Li | H04W 48/16 |
| | | | | 455/434 |
| 2013/0343338 | A1* | 12/2013 | Campos | H04W 16/28 |
| | | | | 370/330 |
| 2015/0327079 | A1* | 11/2015 | Wu | H04W 16/04 |
| | | | | 455/562.1 |
| 2015/0341132 | A1* | 11/2015 | Hwang | H04L 5/0048 |
| | | | | 370/329 |
| 2016/0036572 | A1* | 2/2016 | Bhanage | H04L 5/0048 |
| | | | | 370/329 |
| 2016/0119895 | A1* | 4/2016 | Agiwal | H04B 7/0408 |
| | | | | 455/458 |
| 2016/0249366 | A1* | 8/2016 | Seok | H04B 7/024 |
| 2016/0344463 | A1* | 11/2016 | Kim | H04B 7/0456 |

* cited by examiner

*Primary Examiner* — Nicholas Sloms
(74) *Attorney, Agent, or Firm* — Great Lakes Intellectual Property, PLLC (57) ABSTRACT

Wireless communication facilitated with beamforming between devices and base stations, including when one or more devices are located within overlapping areas or ranges of two or more base stations, is contemplated. The beamforming may be implemented according to a non-joint beamforming methodology and/or a joint beamforming methodology, optionally as determined according to uplink/downlink demands and/or communications between multiple base stations.

11 Claims, 8 Drawing Sheets

$$A(BS\Phi1) = \text{Timing} \begin{bmatrix} a_{11} & a_{14} & a_{13} & a_{12} \\ a_{12} & a_{11} & a_{14} & a_{13} \\ a_{13} & a_{12} & a_{11} & a_{14} \\ a_{14} & a_{13} & a_{12} & a_{11} \\ t_0 & t_1 & t_2 & t_3 \end{bmatrix}$$

$$B(BS\Phi2) = \text{Timing} \begin{bmatrix} b_{11} & b_{13} & b_{12} \\ b_{12} & b_{11} & b_{13} \\ b_{13} & b_{12} & b_{14} \\ & & \\ t_0 & t_1 & t_2 \end{bmatrix}$$

Fig. 8

$$A_1(BS\Phi1) = \text{Timing} \begin{bmatrix} a_{11} & a_{14} & a_{13} & a_{12} \\ a_{12} & a_{11} & a_{14} & a_{13} \\ a_{13} & a_{12} & a_{11} & a_{14} \\ a_{14} & a_{13} & a_{12} & a_{11} \\ t_0 & t_1 & t_2 & t_3 \end{bmatrix}$$

$$B_1(BS\Phi2) = \text{Timing} \begin{bmatrix} b_{11} & b_{14} & b_{13} & b_{12} \\ b_{12} & b_{11} & b_{14} & b_{13} \\ b_{13} & b_{12} & b_{11} & b_{14} \\ b_{14} & b_{13} & b_{12} & b_{11} \\ t_0 & t_1 & t_2 & t_3 \end{bmatrix}$$

$>>A_2*B_2$
ans =

$$\begin{bmatrix} 0 & 0 & 0 & 1 \\ 0 & 0 & 1 & 0 \\ 0 & 1 & 0 & 0 \\ 1 & 0 & 0 & 0 \end{bmatrix}$$

$>>A_2\text{\textasciicircum}2$
ans =

$$\begin{bmatrix} 0 & 0 & 1 & 0 \\ 0 & 1 & 0 & 0 \\ 1 & 0 & 0 & 0 \\ 0 & 0 & 0 & 1 \end{bmatrix}$$

$>>B_2*A_2$
ans =

$$\begin{bmatrix} 0 & 0 & 0 & 1 \\ 0 & 0 & 1 & 0 \\ 0 & 1 & 0 & 0 \\ 1 & 0 & 0 & 0 \end{bmatrix}$$

$>>B_2\text{\textasciicircum}2$
ans =

$$\begin{bmatrix} 1 & 0 & 0 & 0 \\ 0 & 0 & 0 & 1 \\ 0 & 0 & 1 & 0 \\ 0 & 1 & 0 & 0 \end{bmatrix}$$

COORDINATED BEAMFORMING

CROSS-REFERENCE TO RELATED APPLICATIONS

This application claims the benefit of U.S. provisional Application No. 62/295,590 filed Feb. 16, 2016, the disclosure of which is incorporated in its entirety by reference herein.

TECHNICAL FIELD

The present invention relates to coordinated beamforming, such as but not necessary limited to coordinated beamforming for two or more base stations having overlapping or neighboring coverage areas.

BACKGROUND

A beam-forming enabled Radio Unit (RU) operating in an overlapping service area of multiple neighboring beam-forming enabled base stations (BSs) could experience an increased Quality of Service (QoS) in terms of increased throughput and latency when serviced cooperatively by the afore-mentioned base stations.

The same RU will face additional challenges in properly synchronizing to the aforementioned set of BSs, when re-using the same synchronization sequences used for getting registered with the servicing BS. One non-limiting aspect of the present invention contemplates ameliorating synchronization difficulties for devices in an overlapping position relative to two or more base stations

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figures 1, 2, 3:
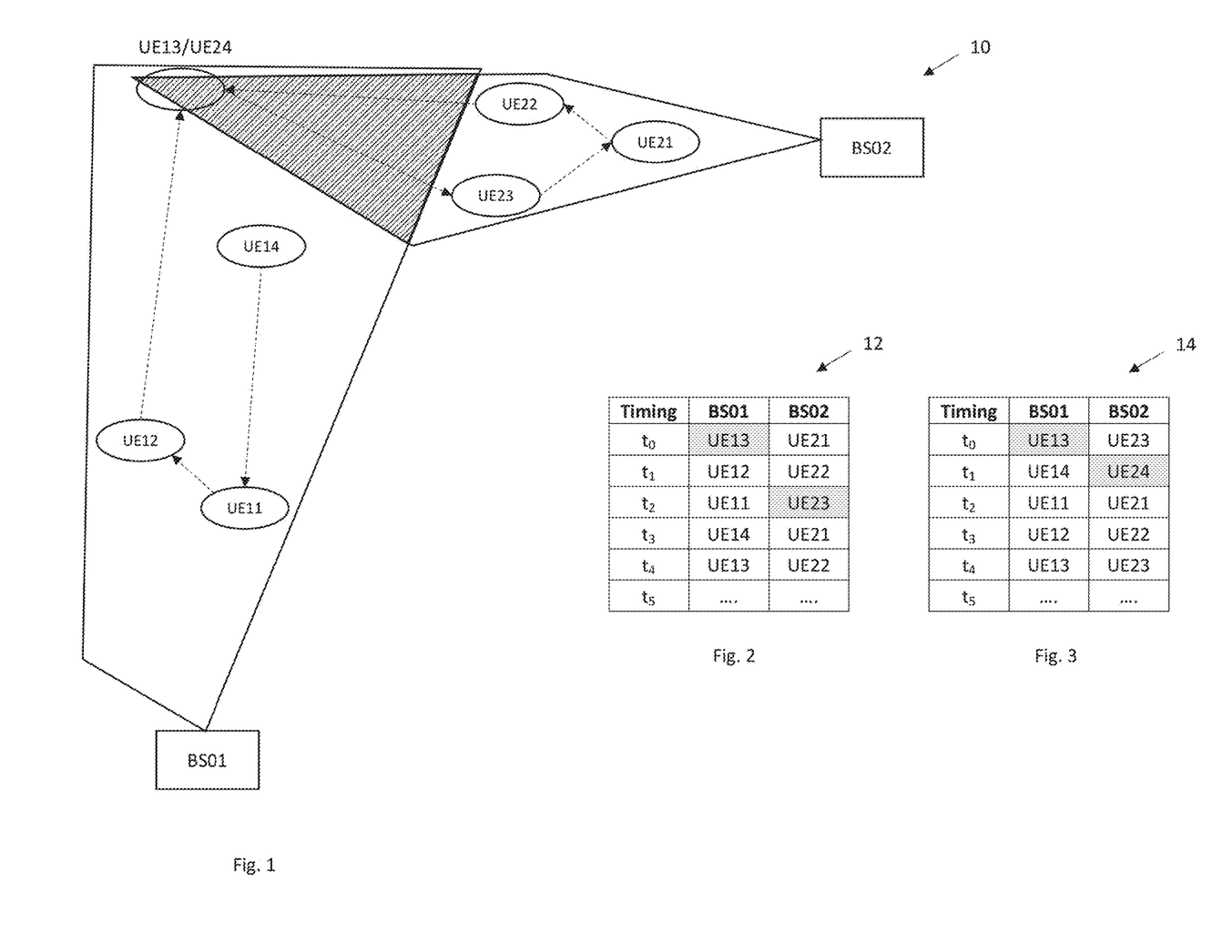
FIG. 1 illustrates a system for facilitating wireless communications in accordance with one non-limiting aspect of the present invention.
FIG. 2 illustrates a timing diagram in accordance with one non-limiting aspect of the present invention.
FIG. 3 illustrates a timing diagram in accordance with one non-limiting aspect of the present invention.

FIG. 1 illustrates a system 10 for facilitating coordinated beam-formed wireless communications in accordance with one non-limiting aspect of the invention. The system 10 may provide operations and/or communications commensurate with, an Orthogonal FDMA (OFDMA) network, a fourth generation (4G) network, a fifth-generation (5G) network, a Long Term Evolution (LTE) network, a 3GPP Long Term Evolution Advanced (LTE-A) network, a High Speed Packet Access (HSPA) network, a Wi-Fi 802.11ac/ax (WLAN) network, an IEEE 802.16 (WiMax) network, optionally with backhaul transport and/or support in the manner described in Multiple-Input Multiple-Output (MIMO) communications of U.S. patent application Ser. Nos. 14/181,640, 14/181,641, 14/181,643 and 14/181,645, the disclosures of which are hereby incorporated by reference in their entireties herein. Some of the communications may be implemented according to the Data-Over-Cable Service Interface Specifications (DOCSIS) version 3.0 and/or version 3.1 series of specifications, e.g., the related DOCSIS specifications may include the Physical Layer Specification (CM-SP-PHYv3.0 or v3.1), the Media Access Control and Upper Layer Protocols Interface Specification (CM-SP-MULPIv3.0 or v3.1), the Cable Modem Operations Support System Interface Specification (CM-SP-CM-0551v3.1), the Operations Support System Interface Specification (CM-SP-0551v3.0), the Converged Cable Access Platform Operations Support System Interface Specification (CM-SP-CCAP-0551v3.1), the Security Specification (CM-SP-SECv3.0 or v3.1) and/or the Cable Modem CPE Interface Specification (CM-SP-CMCIv3.0), the disclosures of which are hereby incorporated by reference in their entireties herein The system 10 is shown to include a first base station (BS) BS01 and a second BS BS02 having antenna arrays, interfaces, software, processors, etc. to facilitate wireless signaling with a plurality of devices, generically referred to as user equipment (UE) UE11, UE12, UE13, UE14, UE21, UE22, UE23 and UE24 (same as UE13 and reference to BS02) similarly configured with antenna arrays, interfaces, software, processors, etc. The base stations and the devices are generically referenced for exemplary non-limiting purposes as the present invention contemplates facilitating wireless signaling between virtually any type of logically executing machines having capabilities sufficient to perform the operations contemplated herein and nearly differentiate the devices and the base stations for presentation purposes. The base stations may be wireless base stations supporting OFDM, OFDMA or single-carrier PHY, which may be generally characterized as stationary or limited mobility types of devices in so far as being generally fixed in one location when operating normally, although the present invention is not necessary so limited. The devices may be more mobile devices or features moving frequently or periodically between locations, at least in comparison to the base stations, such as but not necessary limited to user equipment (UE), mobile stations (STAs), cellular phones, tablets, computers, customer premise equipment (CPE) and the like. Another point of differentiation may be the base stations being operable to service a particular area whereas the devices may be operable to move between the various supported areas.

One non-limiting aspect of the present invention contemplates some or all of the base stations/devices, or other features, entities, constructs, etc. similarly operable herewith, having capabilities sufficient to facilitate, beamforming, and other signal processing/forming competences whereby the base stations/devices correspondingly include architectures, hardware, antennas, processing, etc. sufficient to facilitate exchanging signals with multiple base stations/devices simultaneously, parallelly, sequentially or in any other manner commensurate with the methodologies contemplated and/or described herein. The base station/devices may include capabilities sufficient for using and manipulating signaling across multiple frequencies, bands, spectrums, subcarriers, etc., including competences for lower frequencies or longer wavelengths (e.g., <5 GHz) as well as capabilities to support cm/mm frequency bands and/or frequencies contemplated for exchanging significant amounts of data, blocks, frames, information, etc. as expected for 5G, e.g., at the 28 Gigahertz, 37 GHz and/or 39 GHz bands currently approved in the U.S. for 5G.

The base stations may be configured to provide wireless services including control and signaling information within a coverage area or cell defined according to signaling strength, antenna directionality, licensing or geographical restrictions and other design factors. The cells may be formed into virtually any shape and size and are illustrated with quadrilateral, polygons enumerating the effective metes and bounds of the wireless signaling associated therewith. The effective signaling may be characterized as that needed to maintain a minimum quality of service (QoS) desired for customer satisfaction, such as but not necessary limited to the QoS and attendant signal quality, Rx power, etc. needed to support 5G in a small cell type of deployment. While some of the control/signaling information from the base stations may reach areas beyond of the illustrated metes and bounds, that signaling may be insufficient to properly support communications or maintain the minimum quality of service needed for customer satisfaction and/or due to licensing or other limitations the corresponding base station may be prevented from operating intentionally beyond its cell. A shaded portion is shown to demonstrate where portions of the cells have been formed/shaped in such a manner as to produce an overlapping coverage area or geographical region in which the devices, when positioned therein, may be characterized as being in an overlapping position/location suitable for enabling signaling to be exchanged with both base stations.

FIG. 2 illustrates a timing diagram 14 for facilitating regular or non-joint beamforming in accordance with one non-limiting aspect of the present invention. The regular or non-joint beamforming may be characterized as enabling wireless signaling between the devices connected to one base station, optionally while one or more of the devices is positioned within the overlapping area (shade by both of BS01 and BS02 and any additional base stations (not shown)). The regular beamforming may include the devices implementing synchronization, beam detection, tracking and other processes to obtain control, PHY and other information necessary for communicating with one or more of the base stations, e.g., the beam tracking sequence may be executed in time using a timing sequence pattern configured in a semi-persistent or dynamic way. The devices may be connected to the base station providing the strongest signal thereto and/or through other decision-making, such as instructions provided from one of the base stations after the base stations have communicated with each other to determine service groups or other identifiers of devices identified for access, which one of the base stations is preferred for communication. The devices in the non-overlapping area may connect with the base station of the corresponding cell and the devices in the overlapping area may utilize synchronization signal strength or other parameters to select the appropriate base station. The regular beamforming may limit the devices to connecting with a single one of the base stations such that subsequent signaling while operating according to the regular beamforming occurs with no more than one base station even when one of the devices is in effective range to another base station.

The regular beamforming may include the base stations individually and sequentially directing beams towards the devices in their cell such that each device in turn is allocated traffic one-at-a-time. The corresponding beams may be the same, different and/or narrower or occupy different PHY resources than the beams/signaling and/or subcarriers used to communicate the synchronization and related information used for establishing connection with the base stations. The beams are generically used to exchange control/signaling and user data with the users. One non-limiting aspect of the present invention contemplates the regular beamforming being implemented in a sequential manner whereby each base station directs or allocates a formed beam to a corresponding one of the devices at various intervals, such as in the illustrated manner where the BS01 at time $T_0$ forms a beam towards a first device UE13, at time $T_1$ shifts the beam towards a second device UE12, at time $T_2$ further shifts the beam towards a third device UE11, at time $T_3$ further shifts the beam towards a fourth device UE14 and thereafter repeats and the BS02 at time $T_0$ forms a beam towards a fifth device UE21, at time $T_1$ shifts the beam towards a sixth device UE22, at time $T_2$ further shifts the beam towards a seventh device UE23 and thereafter repeats.

The first and second base stations may implement a corresponding beam tracking algorithm or process to facilitate forming and steering beans between the appropriate devices at the allotted intervals. The base stations may communicate with each other to facilitate synchronization of the beam tracking process, such as to facilitate sequencing beams between serviced devices to minimize interference on the control/signaling or user information. One contemplated beam tracking process may include the base stations determining relative beam detection of each device and coordinating the beam sequences/intervals so that the devices in the overlapping area, or devices outside of the overlapping area but closer to each other, are sequenced to maximize temporal spacing during which beams are used to exchange control and user information to their closest neighbors, e.g., the beam towards the third device may be timed with the beam towards the seventh device to maximize the temporal difference between when the closest neighbor, i.e., sixth device, is being serviced. The beam tracking process may also include shaping or otherwise forming the beams in such a manner as to be for narrower than the beams carrying the synchronization and other information needed to establish communications, such that the beams directed towards one device are shaped differently than beams being directed toward another device and/or such that the beams are shaped and sequenced to be centered on one device at a time, which may optionally include tracking and/or predicting movement of the devices.

FIG. 3 illustrates a timing diagram 14 of a beam tracking sequence for supporting joint beamforming in accordance with one non-limiting aspect of the present invention. The joint beamforming (JT-BF) may correspond with enabling devices within the overlapping area to facilitate communications with one or more additional base stations, i.e., while only the BS02 is shown to operate in the overlapping area, additional base station may similarly operate/reach the overlapping area to further enable the joint beamforming algorithm under consideration. The joint beamforming may operate similarly to the regular beamforming in so far as beam tracking and forming and subsequently directing beams to each of the devices in turn, and additionally, with the first device and/or additional devices in the overlapping area being directed beams from the first and second base stations. One non-limiting aspect of the present invention contemplates the joint beamforming being implemented in a sequential manner whereby each base station directs or allocates a formed beam to a corresponding one of the devices at various intervals, such as in the illustrated manner where the BS01 at time $T_0$ forms a beam towards the UE13, at time $T_1$ shifts the beam towards UE14, at time $T_2$ further shifts the beam towards the UE11, at time $T_3$ further shifts the beam towards the UE12 and thereafter repeats and the BS02 at time $T_0$ forms a beam towards the UE23, at time $T_1$ shifts the beam towards the UE24 (first device UE13), at time $T_2$ further shifts the beam towards the UE21 and at time $T_3$ further shifts the beam towards the UE22 thereafter repeats.

The joint beamforming may include the first device selecting one of the BS01 and BS02 to act as a master base station, which for exemplary purposes is illustrated with respect to selection of the BS01. The first/main base station may poll the devices in its cell to determine the neighboring base stations, i.e., the BS02 and/or additional base stations reaching the devices in the first cell. The BS01 may communicate with these neighboring cells via another interface and exchange information concerning a set of users/devices registered to each base station and the users/device covered by the beam tracking algorithm from the neighboring base stations. The neighboring base stations, e.g., the BS02s, may then execute a process for determining the overlapped users/devices that could be serviced jointly with the contemplated joint beamforming. The BS01 and BS02s or other base stations may agree to support joint beamforming for the first device, etc. and then start transmitting related auxiliary signaling information and control information to support the first device thereto, optionally with the base stations transmitting auxiliary signaling information at all times or other regular intervals. The BS01 and BS02s being used for beamforming may change their beamforming tracking processes/patterns in such a way that one overlapped device would be serviced by the BS01 and BS02 at different timing moments.

Figures 4, 5:
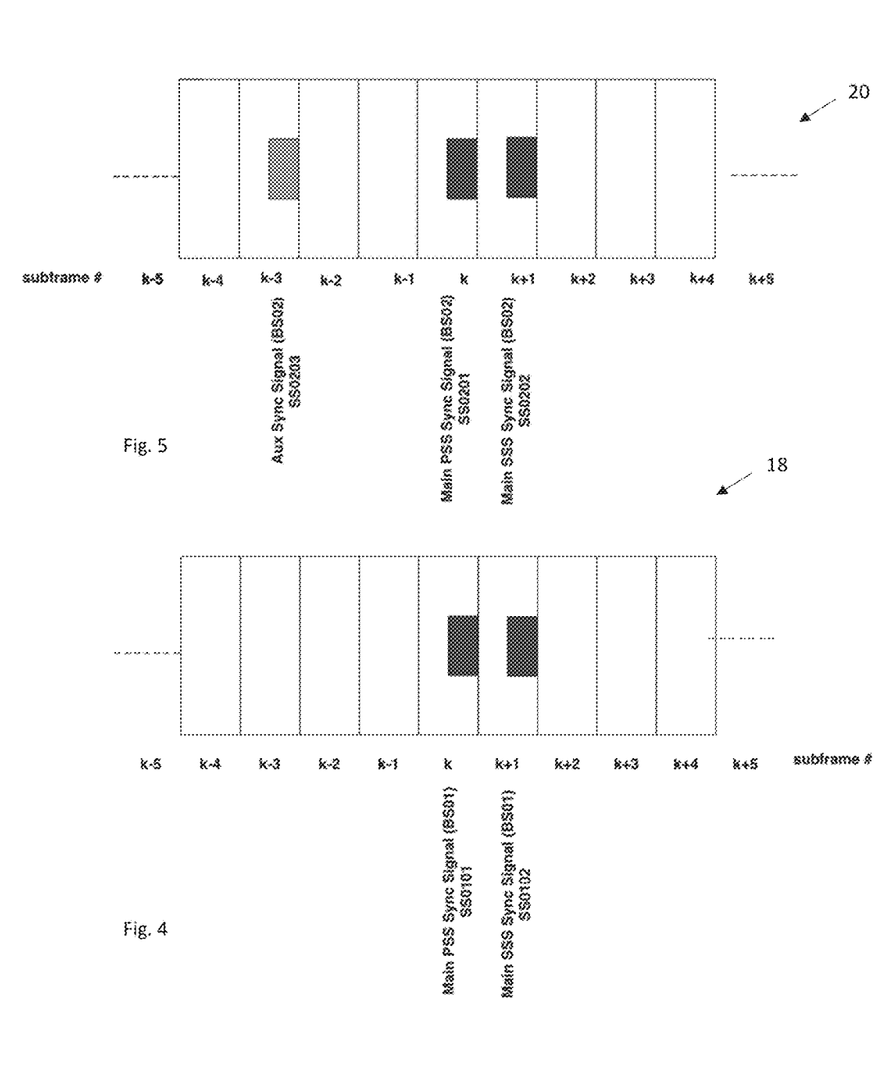
FIG. 4 illustrates a timing diagram of regular synchronization signals in accordance with one non-limiting aspect of the present invention.
FIG. 5 illustrates a timing diagram of regular and auxiliary signaling information in accordance with one non-limiting aspect of the present invention.

FIG. 4 illustrates an example 18 of PHY resource allocation supporting synchronization information being transmitted from the BS01 to facilitate the time and frequency synchronization and subsequent communication therewith in accordance with one non-limiting aspect of the present invention. FIG. 5 an example 20 of PHY resource allocation supporting synchronization information being transmitted from the BS02 to facilitate time and frequency synchronization and JT-BF support subsequent communication therewith in accordance with one non-limiting aspect of the present invention. The diagrams 18, 20 are predominately described with respect to illustrating subframes of a large frame including data, code, logic and other material contemplated to facilitate synchronization of the first device and/or additional devices within the overlapping area or otherwise determined for the contemplated joint beamforming. The auxiliary signaling information process may include the first device being synchronized, authenticated and registered with the closest base station, e.g., a base station whose synchronization information is received with the highest power, which is described as being the BS01 and defined as the main base station. The first device may be initially registered with the BS01 and then subsequently time and frequency synchronized with the BS02, etc. utilizing synchronization information executed in time and frequency (e.g. based on a combination of Zadoff-Chu functions).

The BS02 is frame synchronized with the first BS, such as through coordinated communication, GPS or IEEE1588. The BS02 may re-use the same frame/subframe numbering sequence as the BS01 to facilitate the synchronized timing. The BS01 may detect that either it has downlink data exceeding the regular downlink capability of the first device, for example, or that the first device has too much uplink data to transmit, which may be determined through monitoring a status of soft data buffer of the first device used to facilitate processing data for subsequent communication. The BS01 may poll the first device on the other synchronization signals SS0201 potentially received from other neighboring base stations, e.g., the BS02. The BS01 may then communicate to the BS02 that it desires support for the joint beamforming for at least the first device registered therewith. The BS02 may then turn on an auxiliary signaling information SS0202, such as in response to a request from the BS01. The auxiliary signaling information SS0202 may provide relevant joint beamforming information (beam tracking timing info) for the first device to use in synchronizing (time/frequency) with the BS02 using the main PSS synchronization signal SS0201. The BS02 may then update its beam tracking process to accommodate the first device, including registering the first device as UE24.

Figure 6:
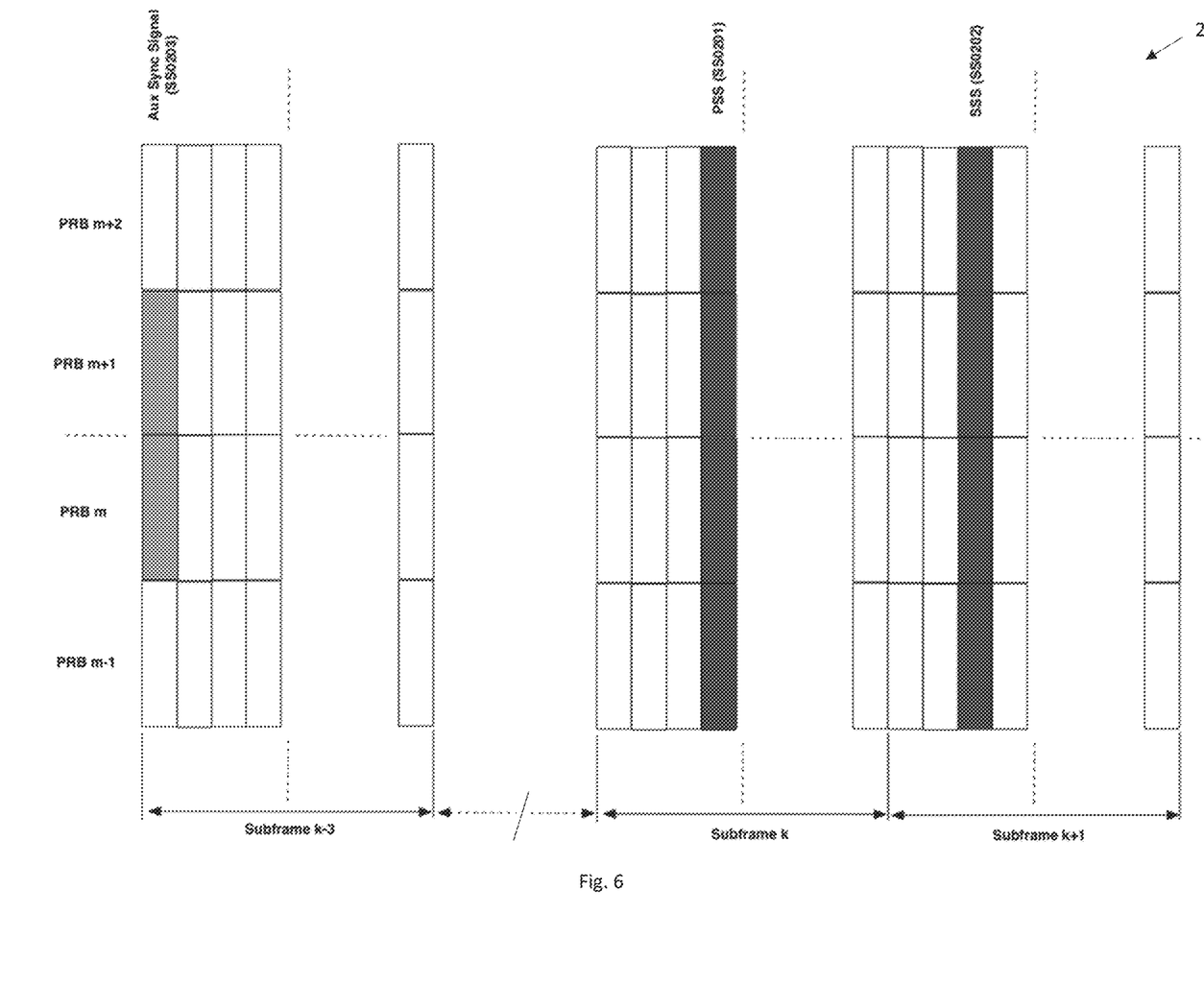
FIG. 6 illustrates an example of PHY allocations for the regular and auxiliary signaling information related signaling in accordance with one non-limiting aspect of the present invention.

FIG. 6 illustrates a diagram 22 of PHY resource allocations for regular and auxiliary signaling information in accordance with one non-limiting aspect of the present invention. The BS02 may transmit via the auxiliary signaling information SS0202 joint beamforming beam tracking detection scheduling information, e.g., column number of its joint beamforming matrix, which may be assigned to the first device on the first row (e.g. 3), thus speeding up the joint beamforming auxiliary transmission. This speeds up the JT_BF process since UE01 is not required to read and ack the control information of BS02. The joint beamforming beam tracking scheduling of the first device relative to the BS02 may be assumed as semi-persistent such that the same symbol number and subcarrier (PHY resource allocation) resources are continuously/periodically re-used. The synchronization sequences may use PSS and SSS in a manner commensurate with LTE cases, such as by deploying the PSS and SSS in the same symbol location as (the LTE case in successive subframes (k and k+1). In one example with k=0:13, the PSS and SSS use a few physical resource blocks (PRBs), e.g., 1 PRB=12 subcarrriers. In this example, the PSS/SSS use two PRBs but in other examples the PSS/SSS may use 6 PRBs and/or the PSS may employ a Zadoff-Chu sequence of length 63 and/or the SSS may use two M-sequences, each one of them employing two different cyclic shifts of single length 31 M sequence. The auxiliary signaling information (ASI) may be lit following the signaling from BS01 to BS02 and turned off once the join beamforming stops, following a request from BS01

Figure 7:
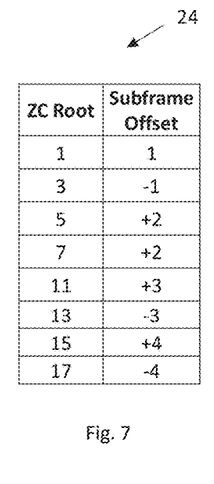
FIG. 7 illustrates coding of subframe timing offset information of auxiliary signaling information related to the values of the Zadoff-Chu roots employed by the auxiliary signaling information with the timing offset being referenced to the timing position of the regular sync signal in accordance with one non-limiting aspect of the present invention.

The ASI may use 2 PRBs, positioned in a known frequency location (e.g. PRB m&m+1) with a Zadoff-Chu sequence of length 23 (as an example). In other embodiments, ASI could use a different PHY resource allocation. FIG. 7 illustrates a diagram 24 in accordance with one non-limiting aspect of the present invention where 8 selected roots of the ZC sequence may be used for signaling a joint beam tracking sequence timing. This sequence timing flags to the first device under JT-BF consideration the subframe offset vs. the first device subframe timing. From processing perspective this is reflected in FIG. 8, where the first row of the matrices developed in real time by the first and second BSs, represent the beam tracking timing for the assigned Rus. Therefore this is represented by the column index offset in the first row of matrices A2 and B2. $ZC(ASI)_{length}=23$; ZC Roots 1, 3, 5, 7, 11, 13, 17 may be selected. The subframe offset coding (number of subframes referenced to the main BS01 subframe timing associated with these roots are presented in the diagram.) ASI may be turned on following the BS01 signaling of a joint beamforming start request and turned off following a secondary joint beamforming stop request. One non-limiting aspect of the present invention contemplates the foregoing processes being implemented in a scenario where the BS01 and BS02s are associated with the same or a common mobile network operator (MNO) such that the base stations are able to communicate with each other and/or facilitate the control of each other as necessary to execute the non-joint and joint beamforming contemplated herein. When the control interface between two or more neighboring BS is expanded across different MNOs, then the JT-BF could be expanded to cover roaming/mobility applications between different MNOs, while supporting JT-BF during this process.

Figure 8:
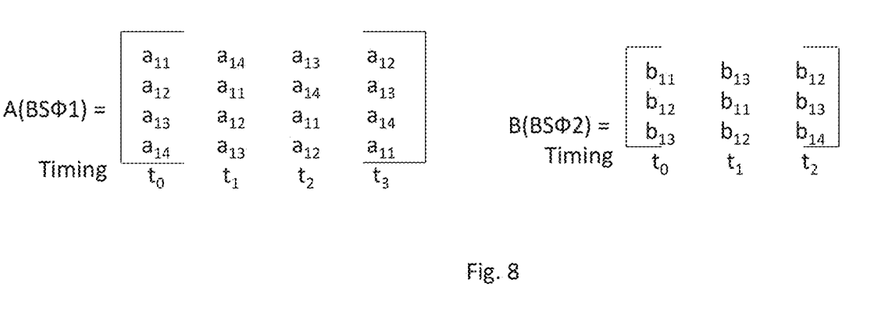
FIGS. 8-11 illustrates digital signal processing flow of matrices representing the radio unit information and their beam tracking timing sequence in accordance with one non-limiting aspect of the present invention.
Figure 9:
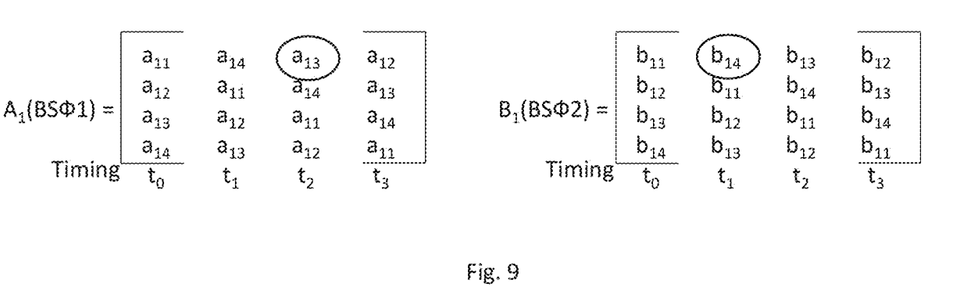

FIG. 8 represents the real time matrices supporting the population of registered and beam-formed enabled UEs, i.e., the UEs having capabilities sufficient for facilitating the beamforming contemplated herein, for one BS against the timing of the beam tracking sequence. Every column of this matrix represents the order of all BF enabled users registered with the BS under consideration against a specific time moment of the beam tracking algorithm. For this embodiment, the first BS has a different number of users than the second BS. FIG. 9 represents the updated beam tracking matrices for the first BS and the second BS, after the first BS polled the first user (in this embodiment user 13) about its position concerning the coverage areas of neighboring BSs. Following the confirmation from the first user of the overlapping coverage with the second BS (BS02 in this embodiment), the first BS will request the second BS to accommodate the first user for a JT-BF operation. Accordingly the second BS will update the content of the beam tracking sequence matrix as represented in FIG. 9 (matrix B1). The first user is signaled between the two BS based on the unique ID of the first user. The first user will be registered by the $2^{nd}$ BS as user 14 (b14 in this embodiment).

Figure 10:
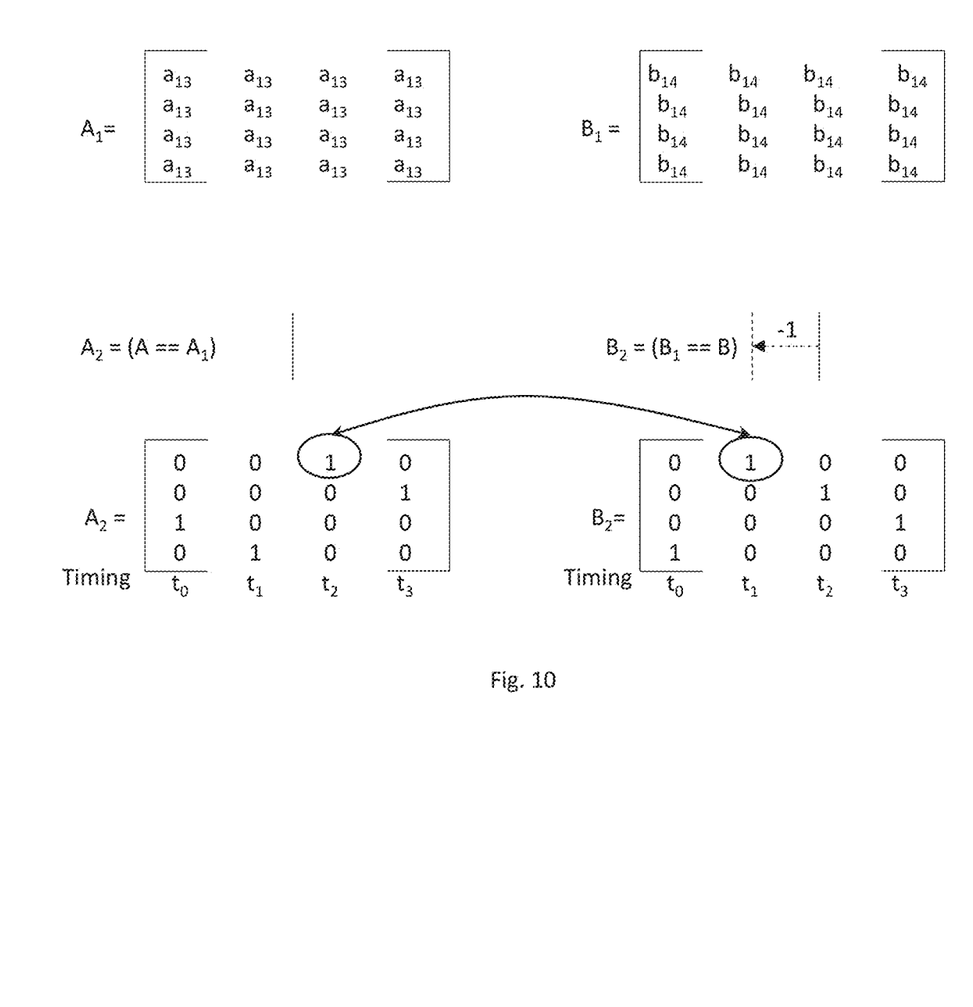
Figure 11:
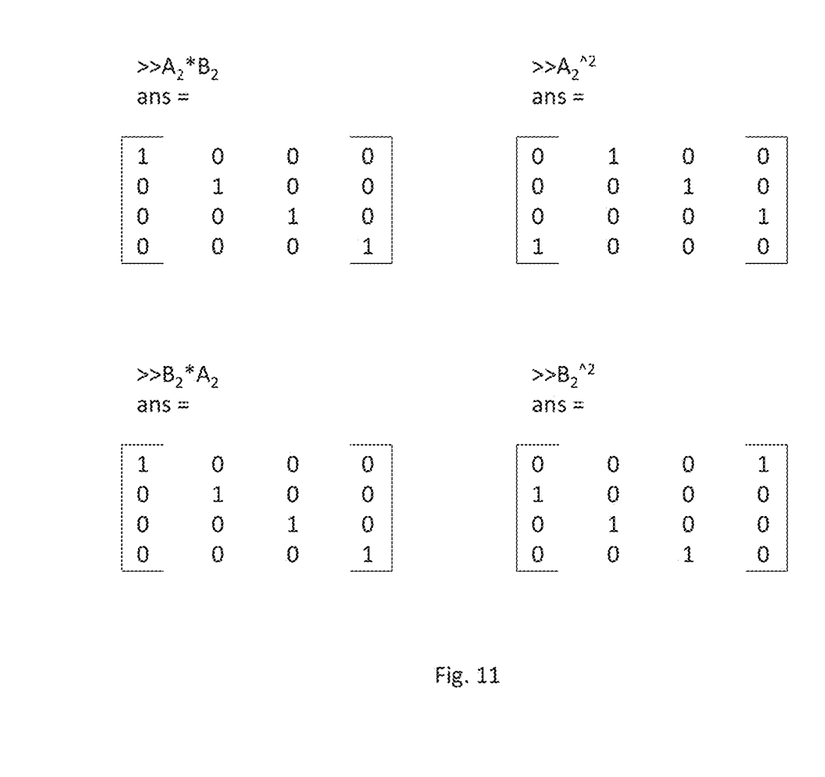

FIG. 10 illustrate reducing the digital processing time, the first and second BS will apply the following processing. The first BS beam tracking matrix will be subject of a logical identity with the first user ID (represented by a13 in this embodiment). The resulting matrix of this logical processing is renamed as A2. The new resulting matrix has m*n size compared with the initial m*n*s, where s is the bit size of the user ID. The second BS will execute the same logical operation on its beam-formed user population. The non-null content of the first row of the beam tracking matrix of the first BS, will indicate the beam tracking timing position for the first BS which coordinates the JT-BF process (BS01 in this embodiment). The column index of the first user occurrence on the first row of the first BS beam tracking matrix, has index column i (3 in this embodiment). The non-null content of the first row of the beam tracking matrix of the second BS, will indicate the beam tracking timing position for the second BS (BS01 in this embodiment). The column index of the first user occurrence on the first row of the second BS beam tracking matrix, has index column j (2 in this embodiment). Since the first user is aware of beam tracking timing position with the first BS, the first user will receive the beam tracking timing information from the second BS (the first row of the beam tracking matrix). The first user will find out its beam tracking timing position with BS02 by executing the subtraction offset=(i−j). IN this embodiment, offset=−1 subframes. The reduced size beam tracking matrix is denominated as JT-BF Normalized Matrix The first and second BS exchange the content of their JT-BF Normalized Matrices (A2 and B2 in one embodiment). The first BS will execute the matricial product A2*B2. If the resulting product matrix is different than the $A2^{\wedge 2}$ matrix, the first BS decides that the JT-BF operation is possible. This operation is presented in FIG. 11.

The second BS will execute the matricial product B2*A2. If the resulting product matrix is different than the $B2^{\wedge 2}$ matrix, the second BS decides that the JT-BF operation is possible. This operation is presented in FIG. 11.

Let's assume the beam tracking matrices of the first and second BS have equal size, following the addition of users subject to JT-BF operation to the second BS.

The above statement could be generalized to the case of i adjacent cells, with an equal amount of users and having an overlapping service area defined by a non-null user population defined by a related vector.

$$\prod_1^i A_i = \prod_i^1 A_i \neq A_j \text{ for } j = 1, \ldots, i$$

Two adjacent cells (A and B) with different number of beam-formed users m, n, where m<n.

$a=\{a_0, a_1, a_2, \ldots, a_{n-1}\}$ and $b=\{b_0, b_1, \ldots, b_{m-1}\}$ being the two vectors determined by the user populations of the two cells aforementioned (m≠n).

c is the vector of the user population positioned in the overlapping area $c=\{c_0 \ldots c_k\}$, where k<n & k≤m.

Define a'={a0, a1, a2, . . . , an, 0, 0, . . . 0} which represents the vector a padded with (m−n) zeros.

A' and B are the related circulant matrixes of vectors a' and b, determined by the user population of cells A and B. The circulant matrixes A' and B are square matrixes of the same size n.

The user population c could be serviced by JT-BF services of cells A and B, as long as A2*B2=B2*A2≠(A2)² & A2*B2=B2*A2≠B2², where A2 and B2 are the user normalized beam tracking sequence matrices for the two adjacent cells.

The above statement could be generalized to the case of i adjacent cells, with an equal amount of users and having an overlapping service area defined by a non-null user population defined by a related vector.

$$\prod_1^i A_i = \prod_i^1 A_i \neq A_j \text{ for } j = 1, \ldots, i$$

Figure 12:
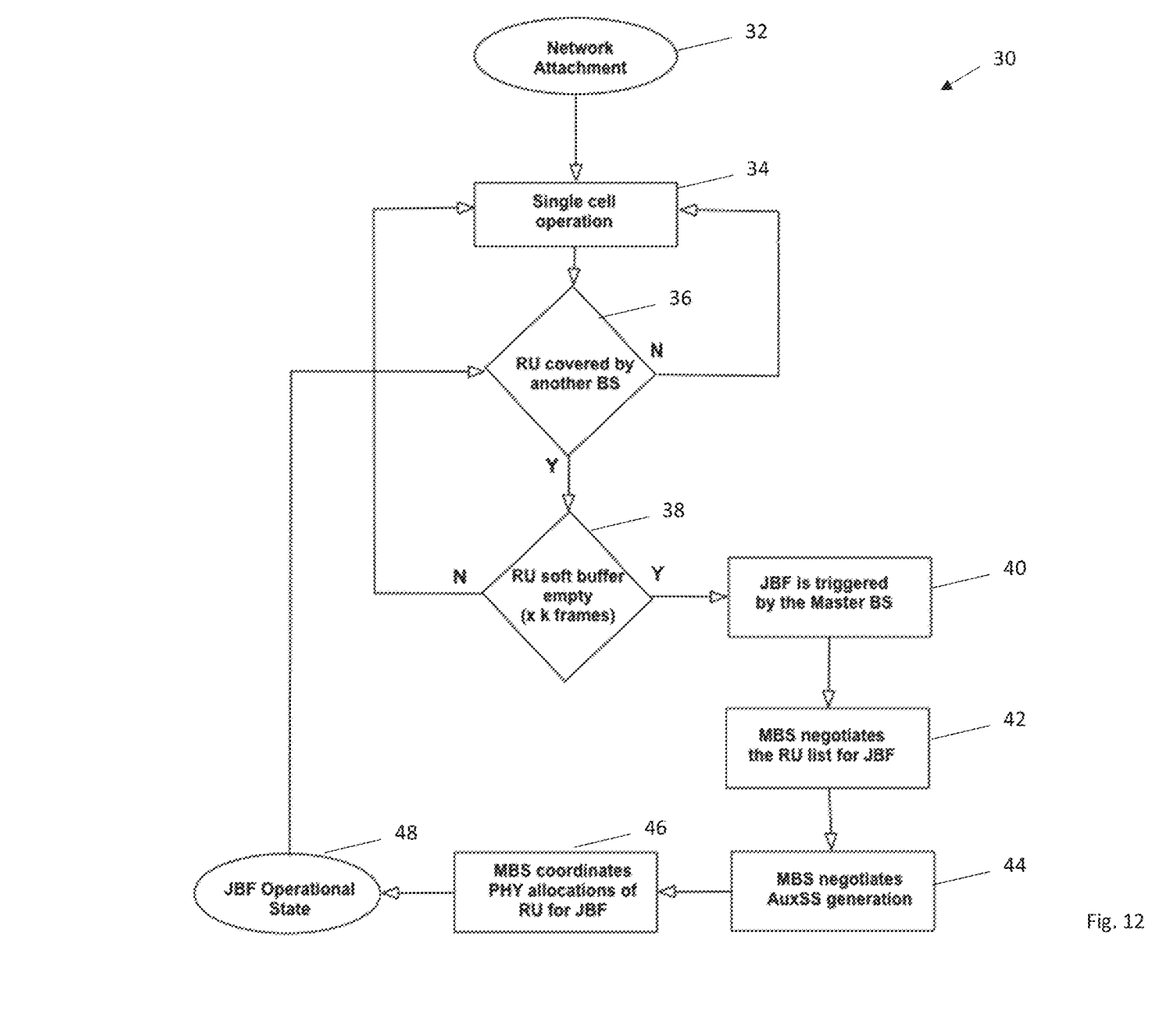
FIG. 12 illustrates a flowchart for a method of joint beamforming in accordance with one non-limiting aspect of the present invention.

FIG. 12 illustrates a flowchart 30 for a method of joint beamforming in accordance with one non-limiting aspect of the present invention. The method may be embodied in a non-transitory computer-readable medium having a plurality of non-transitory instructions executable with a processor associated with a base station or a controller in communication therewith to facilitate the processes and operations contemplated herein. The method contemplates facilitating beamforming in the manner described with respect to FIG. 2, i.e., non-joint beamforming, when operating according to a single cell methodology whereby devices are serviced with a single base station having a beam or other formed/allocated signaling being sequentially directed towards each device sequentially or during different intervals. The method also contemplates facilitating joint beamforming in the manner described with respect to FIG. 3 whereby one or more devices may be serviced according to the non-joint beamforming while one or more devices are serviced with multiple base stations having a beam or other formed/allocated signaling being sequentially directed thereto. The methodologies may be utilized with cooperating MNOs or base stations otherwise having capabilities sufficient to facilitate exchanging information described to enable joint beamforming including synchronization, overlapping determinations through matrix processing in beamforming tracking in the manner described herein.

Block 32 relates to establishing connection other attachment of a device, which may be referred to as a remote unit (RU) to a network or other signaling construct of a given base station, which may correspond with the first device establishing communications with the BS01 such that the BS01 is considered as its master base station. Block 34 relates to the first device operating according the single cell, regular beamforming mode whereby beam formed signals are sequentially exchange therewith in cooperation with other devices being serviced by the BS01, which may occur after the first device has completed registration with only the master base station or the first device has failed to exceed a threshold or other determination predicated for joint beamforming. Block 36 relates to the first device determining whether there are any neighboring base stations, such as the BS02, and/or reporting a list of the neighboring base stations to the master base station, including periodically updating the list on a regular basis. Block 38 relates to the first device and/or the master base station determining whether uplink/downlink data/traffic demands exceed a threshold whereby additional beam formed signals may be desirable to facilitate further communications, e.g., in the event a soft data buffer exceeds a predetermined level.

Block 40 relates to a determination being made to implement joint beamforming dude to the above conditions having been met or other conditions having occurred, e.g., the BS01, the controller and/or another base station may request joint beamforming in response to other network demands or operating conditions of the first device. Block 42 relates to instigating joint beamforming whereby the master base station may negotiate in Block 44 joint beamforming allocations on behalf of the first device, such as by coordinate activities with the BS02 and/or other base stations overlapping the current location of the first device and/or an expected future location of the first device, which may be determined by anticipating its future mobility and/or the list of neighboring base stations. Block 44 relates to the master base station negotiating auxiliary signaling information (transmitted in order to support synchronization in the overlapping area) and/or other information necessary to facilitate establishing communications with an additional base station. Block 46 relates to the master base station coordinating joint beamforming PHY allocations and other related controls through communications with the first device and/or the second or additional base stations to facilitate operating according to joint beamforming. Block 48 relates to the master base station periodically monitoring if the above conditions are being met in a manner sufficient to warrant continued joint beamforming. If not, the first device may be returned to single cell operation, optionally with the auxiliary signaling information being disabled once the first device senses the synchronization signals being received from neighboring BS within a range of k dB (implementation dependent) vs. sync signals received from the master base station.

Figure 13:
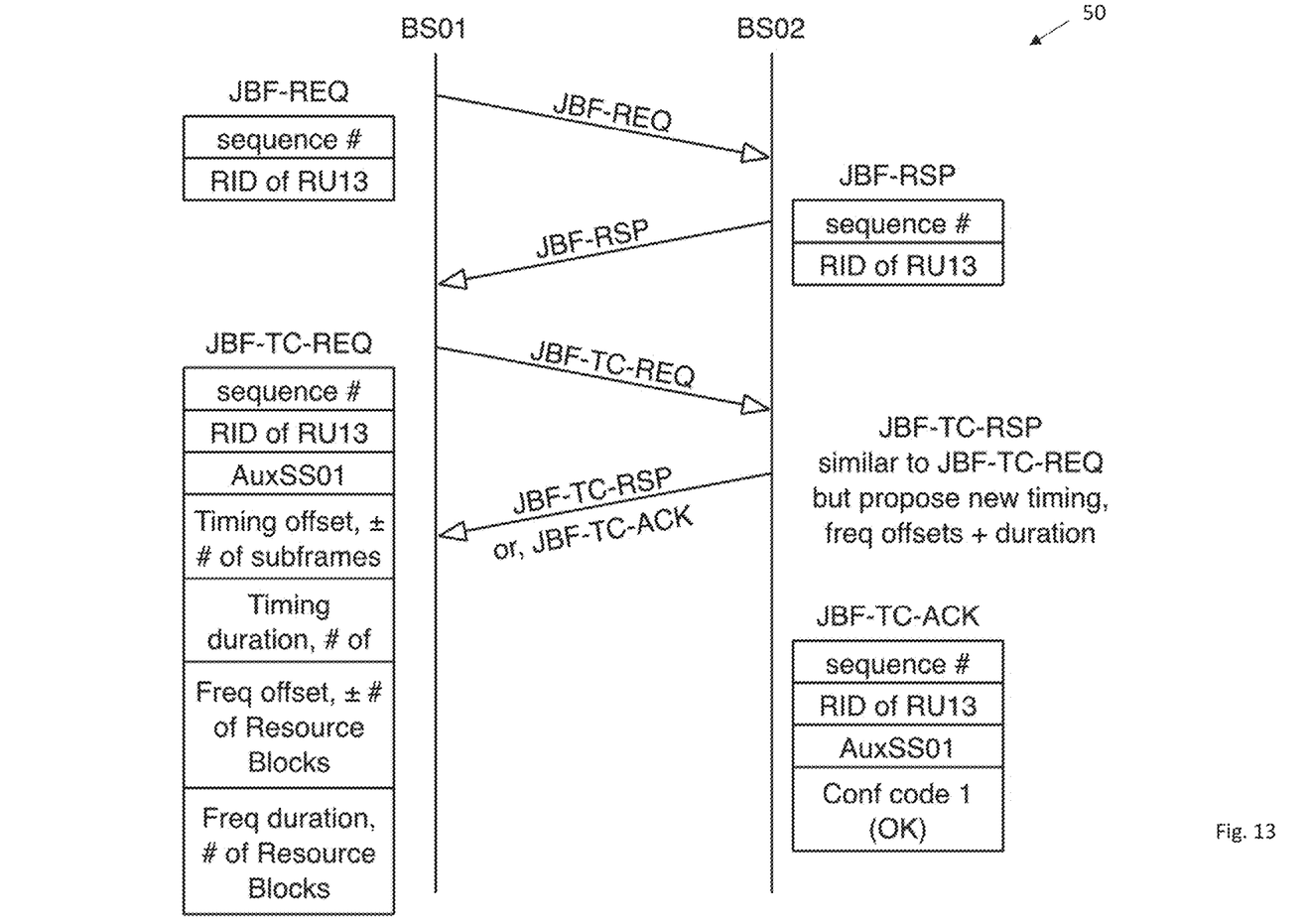
FIG. 13 illustrates a protocol flow for supporting joint-beamforming in accordance with one non-limiting aspect of the present invention.

FIG. 13 illustrates a protocol diagram 50 for facilitating beamforming in accordance with one non-limiting aspect of the present invention. The protocol assigns an initiating base station as the master base station for the purpose of joint beamforming coordination. Each device reports back to its anchor base station the Radio ID (RID) of the neighboring BSs and the related Sync Signal Rx power level, when polled, based on the specific request from the master BS, the received power level of the synchronization signals received from neighboring BS together with the Radio ID (RID) of these BSs. The neighboring BS exchange their ID information and authenticate themselves across the BS-BS interface. Now, BS01 knows UE13 is within BS02 coverage. Upon assessing that UE13 needs to transmit or receive more traffic than the capability its actual capability, BS01 triggers a JT-BF request procedure with the neighboring NS (BS02 in this embodiment). The JT-BF request procedure is triggered by JBF-REQ message sent by BS01 to BS02. This message comprises the RID of the first device (UE13 in this embodiment) and the related beam tracking sequence timing number. Upon the reception of JBF-REQ, BS02 tracks the user employing the respective RID and it allocates a timing slot within the beam tracking timing sequence. It communicates the timing unit back to BS-01, using the JBF-RSP message, align with the RID under negotiation. Upon the reception of JBF-RSP, BS01, will analyze if the beam tracking offset timing is different than the timing offset used by BS02. If yes, BS01 will transmit back to BS02 a time coordination request JBF-TC-REQ signaling the beam tracking offset timing assigned to UE13, the related RID, the timing offset (in symbols referenced to the start of the subframe), the number of frequency offset of the starting Physical REsoruce Block (PRB) and the number of PRBs assigned to UE13. Upon the reception of JBF-TC-REQ. BS02 issues a JBF-TC-RSP, either acknowledging that is ready to start JT-BF protocol or issuing a new JB-RSP. The JBF-TC_ACK comprises the RID, the beam tracking number sequence number and the fact that the auxiliary synchronization information has been turned on.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method for coordinating beamforming for a first base station wirelessly providing a first beam to a first cell and a second base station wirelessly providing a second beam to a second cell, the method comprising:
- determining a first device located within the first cell and the second cell in an overlapping position, the overlapping position characterized by the first device being reachable with the first beam and the second beam;
- coordinating the first beam and the second beam in a sequence whereby the first device is allocated traffic over the first beam at one or more first intervals and the first device is allocated traffic over the second beam at one or more second intervals, the second intervals being temporally different than the first intervals;
- determining a first timing matrix for the first base station, the first timing matrix indicating when the first base station is scheduled to individually direct the first beam towards the first device and one or more additional devices within the first cell;
- determining a second timing matrix for the second base station, the second timing matrix indicating when the second base station is scheduled to individually direct the second beam towards one or more additional devices within the second cell; and
- processing the first and second timing matrices to generate a third timing matrix and a fourth timing matrix sufficient for defining the sequence, the third timing matrix indicating the first intervals and when the first base station is scheduled to direct the first beam towards the one or more additional devices within the first cell, the fourth matrix indicating the second intervals and when the second base station is scheduled to direct the second beam towards the one or more additional devices within the second cell.

2. A method for coordinating beamforming for a first base station wirelessly providing a first beam to a first cell and a second base station wirelessly providing a second beam to a second cell, the method comprising:
- determining a first device located within the first cell and the second cell in an overlapping position, the overlapping position characterized by the first device being reachable with the first beam and the second beam;
- coordinating the first beam and the second beam in a sequence whereby the first device is allocated traffic over the first beam at one or more first intervals and the first device is allocated traffic over the second beam at one or more second intervals, the second intervals being temporally different than the first intervals;
- instructing the first base station to direct the first beam toward the first device during the first intervals;
- instructing the second based station to direct the second beam toward the first device during the second intervals;
- scheduling the first intervals to be interleaved with the second intervals throughout one or more frames, each frame specifying a plurality of subframes defining bandwidth allocation for corresponding transmission of the traffic with the first device;
- determining the first base station being scheduled throughout the frames to repeatedly broadcast a first main synchronization signal, the first main synchronization signal including information sufficient for facilitating synchronization of the first device with the first base station;
- determining the second base station being scheduled throughout the frames to repeatedly broadcast a second main synchronization signal, the second main synchronization signal including information sufficient for facilitating synchronization of a second device with the second base station; and
- instructing the second base station to throughout the frames repeatedly broadcast an auxiliary synchronization signal temporally offset from the first and second main synchronization signals, the auxiliary synchronization signal being sufficient to facilitate synchronization of the first device with the second base station.

3. The method of claim 2 further comprising:
- instructing the first base station to direct the first beam toward a second device during one or more third intervals, the third intervals being temporally different than each of the first intervals;
- instructing the first base station to direct the first beam toward the first device during the first intervals;
- instructing the second based station to direct the second beam toward the first device during the second intervals; and
- scheduling the first intervals to alternate with the second intervals.

4. The method of claim 3 further comprising:
- instructing the first base station to direct the first beam during the third intervals in a manner sufficient for the first beam to reach the second device without simultaneously reaching the first device;
- instructing the first base station to direct the first beam toward the first and second devices during one or more fourth intervals in a manner sufficient for the first beam to simultaneously reach the first and second devices, the fourth intervals being temporally different than each of the first, second and third intervals;
- instructing the first base station to generate the first beam during the first and third intervals with a beam angle narrower than when generating the first beam during the fourth intervals; and
- instructing the first base station to generate the first beam during the fourth intervals with the beam angle being sufficient to cover substantially an entirety of an area of the first cell.

5. The method of claim 2 further comprising:
- generating a first matrix sufficient for identifying a first plurality of devices located within the first cell;
- generating a second matrix sufficient for identifying a second plurality of devices located within the second cell;
- processing the first and second matrices to generate an overlap matrix sufficient for identifying one or more overlapping devices, the one or more overlapping devices corresponding with each of the first and second plurality devices determined to be in the overlapping position; and
- selecting the first device from one of the one or more overlapping devices.

6. A non-transitory computer-readable medium having a plurality of instructions executable with a processor to facilitate coordinating beamforming for a first base station wirelessly providing a first beam to a first cell and a second base station wirelessly providing a second beam to a second cell, the plurality of instructions being sufficient for:

determining a first device located within the first cell and the second cell in an overlapping position, the overlapping position characterized by the first device being reachable with the first beam and the second beam;

coordinating the first beam and the second beam in a sequence whereby the first device is allocated traffic over the first beam at one or more first intervals and the first device is allocated traffic over the second beam at one or more second intervals, the second intervals being temporally different than the first intervals;

determining the first base station to be repeatedly broadcasting a first main synchronization signal at a first repetition rate, the first main synchronization signal including information sufficient for facilitating synchronization of the first device with the first base station;

determining the second base station to be repeatedly broadcasting a second main synchronization signal at a second repetition rate temporally coinciding with the first repetition rate such that the second main synchronization signal overlaps with the first main synchronization signal, the second main synchronization signal including information sufficient for facilitating synchronization of the first device with the second base station;

instructing the first base station to be repeatedly broadcast a first auxiliary synchronization signal at the first repetition rate and temporally offset from the first main synchronization signal, the first auxiliary synchronization signal being a copy of the first main synchronization signal or otherwise sufficient to facilitate synchronization of the first device with the first base station; and instructing the first base station to repeatedly broadcast a second auxiliary synchronization signal at the first repetition rate and temporally offset from the first main synchronization signal and the first auxiliary synchronization signal, the second auxiliary synchronization signal being a copy of the second main synchronization signal or otherwise sufficient to facilitate synchronization of the first device with the second base station.

7. The non-transitory computer-readable medium of claim 6 wherein the plurality of instructions are sufficient for:

determining a third base station to be repeatedly broadcasting a third main synchronization signal at a third repetition rate temporally coinciding the first and second repetition rates such that the third main synchronization signal overlaps with the first and second main synchronization signals, the third main synchronization signal including information sufficient for facilitating synchronization of the first device with the third base station; and instructing the first base station to repeatedly broadcast a third auxiliary synchronization signal at the first repetition rate and temporally offset from the first main synchronization signal and the first and second auxiliary synchronization signals, the third auxiliary synchronization signal being a copy of the third main synchronization signal or otherwise sufficient to facilitate synchronization of the first device with the third base station.

8. The method of claim 2 further comprising:

instructing the first base station to direct the first beam toward the first device during the first intervals;

instructing the second based station to direct the second beam toward the first device during the second intervals; and scheduling the first intervals to be interleaved with the second intervals throughout one or more frames, each frame specifying a plurality of subframes defining bandwidth allocation for corresponding transmission of the traffic with the first device.

9. The method of claim 2 further comprising:

instructing the second base station to commence broadcasting of the auxiliary synchronization signal prior to a beginning of the frames; and instructing the second base station to cease broadcasting of the auxiliary synchronization signal at an ending of the frames.

10. The method of claim 1 further comprising:

determining the first base station to be repeatedly broadcasting a first main synchronization signal, the first main synchronization signal including information sufficient for facilitating synchronization of the first device with the first base station;

determining the second base station to be repeatedly broadcasting a second main synchronization, the second main synchronization signal including information sufficient for facilitating synchronization of the first device with the second base station;

instructing the first base station to be repeatedly broadcast a first auxiliary synchronization signal, the first auxiliary synchronization signal being a copy of the first main synchronization signal or otherwise sufficient to facilitate synchronization of the first device with the first base station; and instructing the first base station to repeatedly broadcast a second auxiliary synchronization signal, the second auxiliary synchronization signal being a copy of the second main synchronization signal or otherwise sufficient to facilitate synchronization of the first device with the second base station.

11. The method of claim 1 further comprising shaping the first beam and the second beam in a one-at-a-time manner whereby traffic carried thereover is limited to the correspondingly directed towards one of the first device and the one or more additional devices within the first and second cells.

* * * * *